United States Patent
Rapin et al.

(10) Patent No.: US 11,840,350 B2
(45) Date of Patent: Dec. 12, 2023

(54) METHOD AND SYSTEM FOR CONTROLLING IDLE SPEED AND DRAWING OF POWER GENERATED BY AN AIRCRAFT ENGINE

(71) Applicants: Airbus SAS, Blagnac (FR); Airbus Operations SAS, Toulouse (FR)

(72) Inventors: Nicolas Rapin, Toulouse (FR); Didier Poirier, Blagnac (FR); Etienne Foch, Toulouse (FR); Paul-Emile Roux, Toulouse (FR); Emmanuelle Escorihuela, Toulouse (FR); Caroline Barnier, Toulouse (FR); Guillaume Alix, Toulouse (FR)

(73) Assignees: AIRBUS SAS, Blagnac (FR); AIRBUS OPERATIONS SAS, Toulouse (FR)

( * ) Notice: Subject to any disclaimer, the term of this patent is extended or adjusted under 35 U.S.C. 154(b) by 55 days.

(21) Appl. No.: 17/629,477

(22) PCT Filed: Jul. 7, 2020

(86) PCT No.: PCT/EP2020/069121
§ 371 (c)(1),
(2) Date: Jan. 24, 2022

(87) PCT Pub. No.: WO2021/018524
PCT Pub. Date: Feb. 4, 2021

(65) Prior Publication Data
US 2022/0268218 A1    Aug. 25, 2022

(30) Foreign Application Priority Data
Jul. 29, 2019 (FR) ....................... 1908596

(51) Int. Cl.
*B64D 31/06* (2006.01)
*B64D 41/00* (2006.01)
(Continued)

(52) U.S. Cl.
CPC ............. *B64D 31/06* (2013.01); *B64D 41/00* (2013.01); *F02C 6/04* (2013.01); *F02C 9/00* (2013.01);
(Continued)

(58) Field of Classification Search
CPC ...... F02C 9/00; F02C 9/26; F02C 9/48; F02C 9/50; F02C 9/52; F02C 9/54;
(Continued)

(56) References Cited

U.S. PATENT DOCUMENTS

| | | | |
|---|---|---|---|
| 8,321,118 B2* | 11/2012 | Moeckly ............ | G05B 23/0254 701/99 |
| 2010/0161197 A1* | 6/2010 | Moeckly ............ | G05B 23/0254 701/99 |

(Continued)

FOREIGN PATENT DOCUMENTS

| | | | | |
|---|---|---|---|---|
| EP | 3045696 A1 | | 7/2016 | |
| EP | 3130783 A1 | * | 2/2017 | ............. B64D 27/10 |
| EP | 3339653 A1 | * | 6/2018 | ............. F04D 25/16 |

OTHER PUBLICATIONS

International Search Report; priority document.
French Search Report; priority document.

*Primary Examiner* — Alain Chau
(74) *Attorney, Agent, or Firm* — Greer, Burns & Crain, Ltd.

(57) ABSTRACT

A system for controlling idle speed and power draw includes a determination unit configured to determine a current available power value, a determination unit configured to determine a current power consumption value, a determination unit configured to determine a future power requirement variation value, a computation unit configured to calculate a future estimated total power requirement value, a computation unit configured to calculate a future estimated available power value, an optimization unit configured to determine (Continued)

an optimization result by comparing the estimated total power requirement value with a power value associated with an optimization criterion and a controller configured to send an order to adapt an idle speed of the engine, an order to adapt the estimated total power requirement or no order as a function of the optimization result.

10 Claims, 3 Drawing Sheets

(51) Int. Cl.
*F02C 6/04* (2006.01)
*F02C 9/50* (2006.01)
*F02C 9/00* (2006.01)
*B64D 13/06* (2006.01)

(52) U.S. Cl.
CPC ........ *F02C 9/50* (2013.01); *B64D 2013/0603* (2013.01); *F05D 2270/101* (2013.01); *F05D 2270/44* (2013.01)

(58) Field of Classification Search
CPC ............. F05D 2260/80; F05D 2260/81; F05D 2260/82; F05D 2260/821; F05D 2270/304; F05D 2270/305; B64D 31/00; B64D 31/06; G05B 23/0294
See application file for complete search history.

(56) References Cited

U.S. PATENT DOCUMENTS

| | | |
|---|---|---|
| 2016/0208717 A1 | 7/2016 | Cai |
| 2018/0163734 A1 | 6/2018 | Barkowsky et al. |
| 2021/0164406 A1* | 6/2021 | Nishizawa ............ F04D 27/001 |

* cited by examiner

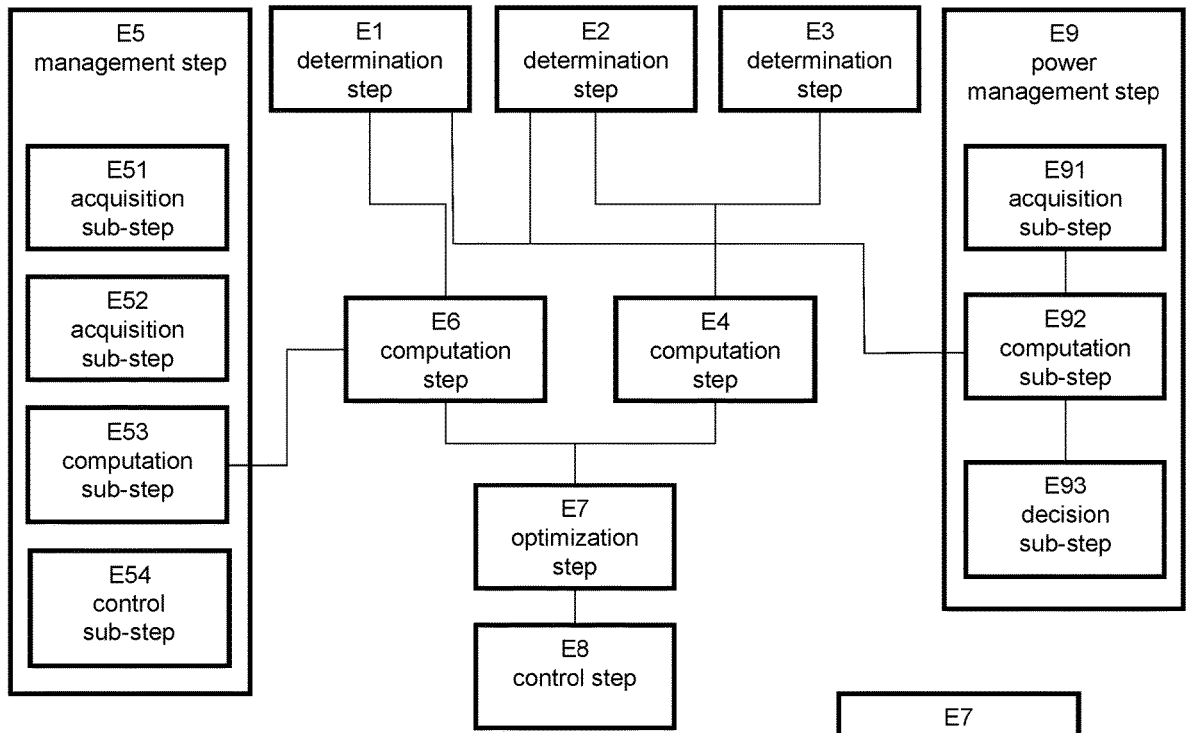
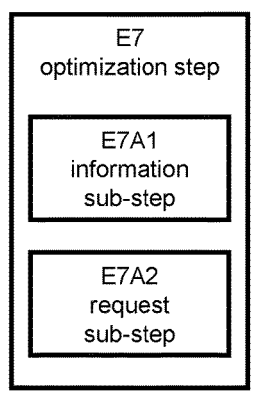
Fig. 4
Fig. 5A
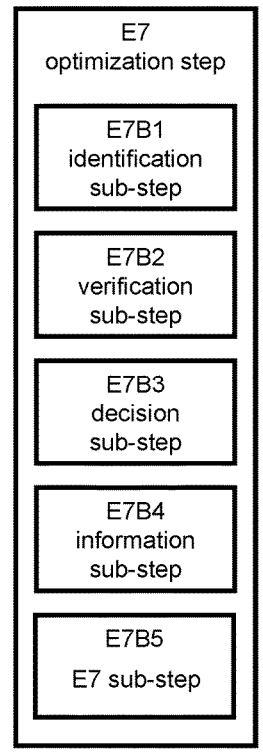
Fig. 5B

METHOD AND SYSTEM FOR CONTROLLING IDLE SPEED AND DRAWING OF POWER GENERATED BY AN AIRCRAFT ENGINE

CROSS-REFERENCES TO RELATED APPLICATIONS

This application claims the benefit of the International Application No. PCT/EP2020/069121, filed on Jul. 7, 2020, and of the French patent application No. 1908596 filed on Jul. 29, 2019, the entire disclosures of which are incorporated herein by way of reference.

FIELD OF THE INVENTION

The present invention relates to a method and a system for controlling idle speed and drawing of power generated by an aircraft engine.

BACKGROUND OF THE INVENTION

Although not exclusively, the present invention applies to aircraft propulsion turbomachines, in particular for transport airplanes.

Aircraft propulsion turbomachines, hereinafter referred to as "engines", include one or more compressors that aspirate and compress air, to convey the air into one or more combustion chambers. The air expanded by the combustion chambers then passes through one or more turbines that drive, using a rotary shaft, the compressor or compressors and all of the elements required to operate the engine. Once the rotational speed is sufficient, the engine operates autonomously to reach the engine idle speed.

Although most of the power generated by the engine is used to propel the aircraft, a portion of this power is drawn off to operate certain systems in the aircraft. The power drawn can be hydraulic, electrical or pneumatic. Hydraulic power is used primarily to power the flight controls of the aircraft, the landing gear extension and retraction systems, etc. Electrical power is used primarily to power the passenger entertainment systems, avionics, lighting, etc. Pneumatic power is used to power the cabin air-conditioning and pressurization system, the system used to protect the wings and nacelles against ice, and to start the engines. This is achieved by drawing of a portion of the air compressed by the compressor or compressors, which reduces the air flow rate.

Furthermore, some engines, such as engines with very high bypass ratios, are being planned and studied for integration into future aircraft. Operation of this type of engine is optimized to reduce the fuel consumption of aircraft. To do so, the size of the portion of the engine from which the mechanical power required by the aircraft is drawn is reduced. Such a reduction makes the drawing of power increasingly restrictive, notably at idle speed, which increases the risk of a compressor surge.

Indeed, during operation, a compressor can suffer from aerodynamic stalling. This phenomenon, also referred to as "compressor surge", is caused by an excessive pressure difference between the low-pressure portion and the high-pressure portion of a compressor. More specifically, the air in the high-pressure portion of the compressor is pushed back into the low pressure portion. These variations in air flow rate result in a loss of performance in the engine and cause wear in the compressors.

To obviate the risk of compressor surge, the idle speed can be increased to enable the engine to provide enough power. However, increasing the idle speed results in an increase in engine thrust, which can have operational impacts on the wear caused to the brakes on the ground, on noise, on the fuel consumption of the aircraft, etc.

The idle speed can also be limited by minimizing the power drawn from the engine, but restricting the aircraft systems could result in the sub-optimal use of the potential of these systems.

Another option involves increasing the size of the body of the engine for power draw requirements. This is equivalent to not optimizing the engine in order to guarantee the operability thereof, increasing the fuel consumption of the aircraft.

None of the aforementioned solutions is therefore entirely satisfactory for the applications envisaged.

Furthermore, the electrical power requirements in aircraft are increasing, both for passenger comfort and for more advanced aircraft systems. This trend accentuates the risks mentioned above.

SUMMARY OF THE INVENTION

The present invention is intended to overcome this drawback.

The invention relates to a method for controlling idle speed and power draw, the power being generated by at least one engine of an aircraft.

According to the invention, the method includes the following successive steps:
- a first determination step implemented by a first determination unit, that involves determining at least one current available power value using data on current power draw capacity from the at least one engine of the aircraft and from at least one auxiliary power source,
- a second determination step, implemented by a second determination unit, that involves determining at least one current power consumption value using current power data representing the power requirements of at least one consumer system of the aircraft,
- a third determination step, implemented by a third determination unit, that involves determining at least one future power requirement variation value, using power data estimated by the at least one consumer system and the current power data, the estimated power data representing the future power requirements of the at least one consumer system,
- a first computation step, implemented by a first computation unit, that involves calculating at least one future estimated total power requirement value using the at least one current power consumption value and the at least one power requirement variation value,
- a second computation step, implemented by a second computation unit, that involves calculating at least one future estimated available power value on the basis of the at least one current available power value, at least one future estimated pneumatic draw value and as a function of at least one estimate criterion,
- an optimization step, implemented by an optimization unit, that involves determining an optimization result by comparing the at least one estimated total power requirement value with at least one power value associated with at least one optimization criterion, and
- a control step, implemented by a control unit, that involves issuing an adaptation order of an idle speed of the at least one engine, an adaptation order for the future estimated total power requirement or no order as a function of the optimization result.

The invention therefore enables the idle speed of the engine to be adapted to the power draw or, conversely, enables the power draw to be adapted to the engine idle speed, depending on the priorities defined by the invention (as a function of the flight phase and of the strategy selected by the pilot) very quickly. Adaptation of the idle speed also depends on the requirements of the consumer systems and the capacity of the systems to reduce the requirements temporarily.

Advantageously, the method includes a power management step, implemented by a power management unit following the second determination step, the power management step including the following successive sub-steps:
- a first acquisition sub-step, implemented by a first acquisition module, that involves acquiring at least one current charged power value and a current state of charge of a secondary power source,
- a first computation sub-step, implemented by a first computation module, that involves calculating at least one current power difference value between the at least one current available power value and the at least one current power consumption value,
- a decision sub-step, implemented by a decision module, that involves:
- issuing an order to charge the secondary source, if the at least one current power difference value is positive or zero,
- sending, to the secondary source, an order to provide at least one charged power value equal to the at least one current power difference value, if the at least one current power difference value is negative and if the at least one charged power value of the secondary source is greater than the at least one current power difference value, and
- sending, to the secondary source, an order to provide all of the charged power and sending a temporary limitation order applicable to the current power consumption to the at least one consumer system, if the at least one current power difference value is negative and if the at least one charged power value of the secondary source is less than the at least one current power difference value.

Preferably, the optimization step also includes an identification sub-step, implemented by an identification module, that involves identifying at least one future reduced power requirement value using limitation data on at least one power requirement of the at least one consumer system.

Furthermore, advantageously, the method also includes a pneumatic draw management step, implemented by a pneumatic draw management unit upstream of the second computation step, the management step including the following successive sub-steps:
- a second acquisition sub-step implemented by a second acquisition module, that involves acquiring data on current pneumatic draw associated with a current pneumatic draw quantity from the at least one engine of the aircraft and from the at least one auxiliary power source,
- a third acquisition sub-step, implemented by a third acquisition module, that involves acquiring pneumatic draw stoppage information if a pneumatic draw stoppage request is received by at least one draw system,
- a second computation sub-step, implemented by a second computation module, that involves calculating the at least one future estimated pneumatic draw value using current pneumatic draw data and pneumatic draw stoppage information, and
- a control sub-step, that is implemented by a control module, that involves ordering the future stoppage of the pneumatic draw by the at least one draw system as a function of the automatic draw stoppage information.

Preferably, the power requirements of at least one consumer system include at least:
- remotely managed power requirements,
- power requirements essential to operation of at least one consumer system that are not predictable in time,
- power requirements essential to operation of at least one consumer system that are predictable in time, and
- power requirements not essential to operation of at least one consumer system that are not predictable in time.

The present invention also relates to a system for controlling idle speed and power draw, the power being generated by at least one engine of an aircraft.

According to the invention, the system includes:
- a first determination unit designed to determine at least one current available power value using data on current power draw capacity from the at least one engine of the aircraft and from at least one auxiliary power source,
- a second determination unit designed to determine at least one current power consumption value using current power data representing the power requirements of at least one consumer system of the aircraft,
- a third determination unit that is designed to determine at least one future power requirement variation value, using power data estimated by the at least one consumer system and the current power data, the estimated power data representing the future power requirements of the at least one consumer system,
- a first computation unit that is designed to calculate at least one future estimated total power requirement value using the at least one current power consumption value and the at least one power requirement variation value,
- a second computation unit that is designed to calculate at least one future estimated available power value on the basis of the at least one current available power value, at least one future estimated pneumatic draw value and as a function of at least one estimate criterion,
- an optimization unit that is designed to determine an optimization result by comparing the at least one estimated total power requirement value with at least one power value associated with at least one optimization criterion, and
- a control unit that is designed to issue an adaptation order of an idle speed of the at least one engine, an adaptation order for the future estimated total power requirement or no order as a function of the optimization result.

Advantageously, the system includes a power management unit including:
- a first acquisition module that is designed to acquire at least one current charged power value and a current state of charge of a secondary power source,
- a first computation module that is designed to calculate at least one current power difference value between the at least one current available power value and the at least one current power consumption value,
- a decision module designed to:
- issue an order to charge the secondary source, if the at least one current power difference value is positive or zero, send, to the secondary source, an order to provide at least one charged power value equal to the at least one current power difference value, if the at least one current power difference value is negative and if the at least one charged power value of the secondary source is greater than the at least one current power difference value, and send, to the secondary source, an order to provide all of the charged power and to send a temporary limitation order applicable to the current power consumption to the at least one consumer system, if the at least one current power difference value is negative and if the at least one charged power value of the secondary source is less than the at least one current power difference value.

Furthermore, preferably, the optimization unit also includes an identification module designed to identify at least one future reduced power requirement value using limitation data relating to at least one power requirement of the at least one consumer system.

Furthermore, advantageously, the system also includes a pneumatic draw management unit including:

a second acquisition module that is designed to acquire data on current pneumatic draw associated with a current pneumatic draw quantity from the at least one engine of the aircraft and from the at least one auxiliary source, a third acquisition module that is designed to acquire pneumatic draw stoppage information if a pneumatic draw stoppage request is received by at least one draw system, a second computation module that is designed to calculate at least one future estimated pneumatic draw value using current pneumatic draw data and pneumatic draw stoppage information, and a control module that is designed to order the future stoppage of the pneumatic draw by the at least one draw system as a function of the automatic draw stoppage information.

The present invention also relates to an aircraft, in particular a transport airplane, that is fitted with a power draw management system as described above.

BRIEF DESCRIPTION OF THE DRAWINGS

The attached figures help to understand how the invention can be carried out. In these figures, identical reference signs refer to similar elements.

FIG. 4 is a schematic view of a power draw management method including a succession of steps, according to one embodiment.

FIGS. 5A and 5B are schematic views of an optimization step of a power draw management method comprising a succession of steps, according to a first specific embodiment and a second specific embodiment respectively.

DETAILED DESCRIPTION OF THE PREFERRED EMBODIMENTS

Figure 1:
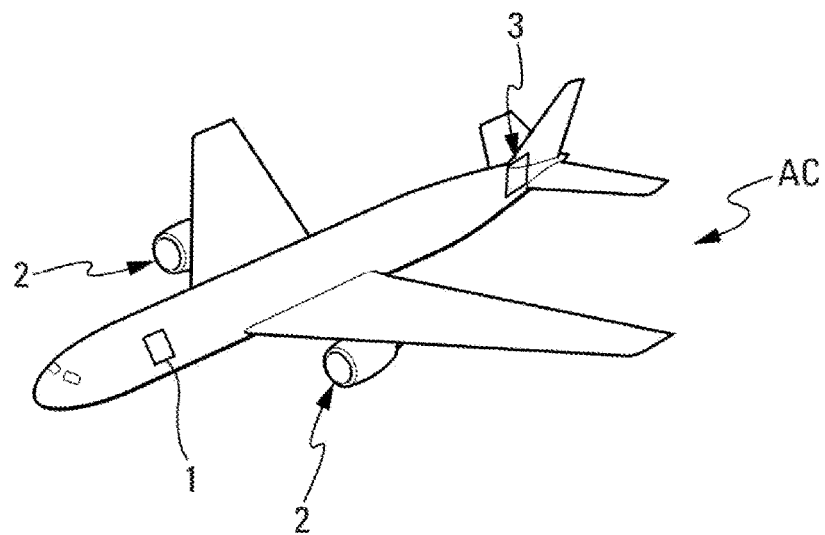
FIG. 1 is a schematic perspective view of an aircraft carrying a power draw management system.
Figure 2:
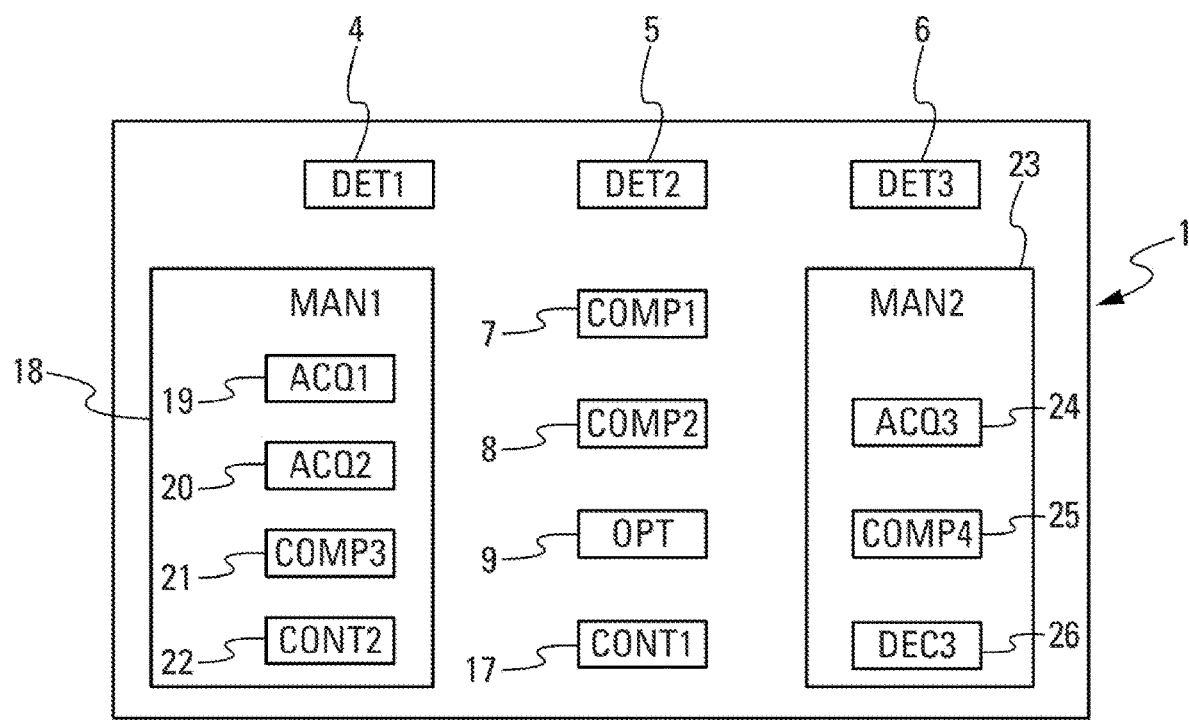
FIG. 2 is a block diagram of a power draw management system showing one embodiment of the invention.

The power draw management system 1 (hereinafter "system 1"), shown schematically in one embodiment in FIG. 2, is designed to manage the draw and distribution of power generated by one or more of the engines 2 of an aircraft AC, in particular a transport airplane (FIG. 1).

Within the scope of the present invention, "power draw" means taking some of the power generated by one or more of the engines 2 to power hydraulic, electrical and pneumatic power networks. Pneumatic power draw refers to powering the pneumatic network, while mechanical power draw refers to powering the electrical and hydraulic networks.

As shown in FIG. 2, the system 1 includes a determination unit DET1 4 that is designed to determine a current available power value. This current available power value is determined in real time using current data on power draw capacity from the engine or engines 2 of the aircraft AC and from an auxiliary power source 3. By way of example, the auxiliary power source 3 is an auxiliary power unit (APU), a supplementary power unit (SPU) or a ground cart. The power draw capacity data are supplied by the engine or engines 2 and the auxiliary power source or sources 3. These data can be associated with current pneumatic power draw, current mechanical power draw, or both.

In a preferred embodiment, the system 1 also includes a determination unit DET2 5. This determination unit 5 is designed to determine a current power consumption value using current power data representing the power requirements of at least one consumer system of the aircraft AC.

Within the scope of the present invention, "consumer system" means any system of the aircraft AC that requires power to operate. This power can be mechanical or pneumatic. By way of example, the environmental control system (ECS) that generates pressurized cabin air is a consumer system with operating power requirements that are associated with a power requirement provided by pneumatic power draw from the engine 2.

Furthermore, the power requirements of a consumer system include at least:

remotely managed power requirements. These are power requirements managed by systems consuming lots of power and including dedicated power management systems. By way of example, the environmental control system has remotely managed power requirements, power requirements essential to operation of a consumer system that are not predictable in time, by way of example, operation of the flight control systems is essential and may require instantaneous power peaks, power requirements essential to operation of a consumer system that are predictable in time. By way of example, extending the landing gear requires a power value that can be anticipated by the system that controls the extension of the landing gear, and power requirements not essential to operation of a consumer system that are not predictable in time.

As shown in FIG. 2, the system 1 also includes a determination unit DET3 6 that is designed to determine at least one future power requirement variation value.

Within the scope of the present invention, "future" means a time after the current data acquisition time (current time). By way of example, the time between the future time and the current time is in the order of five seconds. The future power requirement variation value or values are determined using current power data and future estimated power data. The estimated power datum or data are an estimate of the future requirements of the consumer system or systems. By way of example, the estimate is calculated on the basis of a predetermined model. The predetermined model is used to estimate the remote management requirements, the essential requirements that are foreseeable in time, and the nonessential requirements that are foreseeable in time, in the future, using the current power data.

In a preferred embodiment, the system 1 includes a computation unit COMP1 7 that is designed to calculate at least one future total power requirement value. This or these total power requirement values are associated with an estimate of the power that will be consumed in the future by the consumer systems. This total power requirement value is calculated using the current power consumption value sent by the determination unit 5 and the power requirement variation value sent by the determination unit 6.

Furthermore, and as shown in FIG. 2, the system 1 also includes a computation unit COMP2 8. This computation unit 8 is designed to calculate a future estimated available power value. This estimated available power value represents the estimate of the power that the engine or engines 2 and the auxiliary power source 3 can supply in the future obtained using the predetermined model. This estimated available power value is calculated using the current available power value sent by the determination unit 4. This estimated available power value can also be calculated using a future estimated pneumatic draw value and as a function of at least one estimate criterion. By way of example, the estimate criterion is associated with the absence of a modification of the idle speed of at least one engine 2.

The system 1 also includes an optimization unit OPT 9 that is designed to determine an optimization result representing a comparison of the estimated total power requirement value calculated by the computation unit 7 with a power value associated with at least one optimization criterion.

In a first embodiment of the optimization unit 9, the optimization criterion is an adaptation of the thrust of the engines 2 to the power draw by limiting the reduction of the requirements of the consumer systems. In this first embodiment, the optimization criterion can also be an adaptation of the engine or engines 2 and of the auxiliary source 3 to a future stoppage of the pneumatic power draw.

Figure 3A:
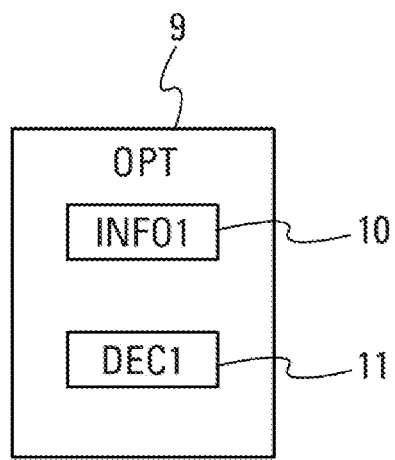
FIGS. 3A and 3B are block diagrams of an optimization unit of a power draw management system showing respectively a first specific embodiment and a second specific embodiment.

In this first embodiment, the power value associated with the optimization criterion is represented by the estimated available power value sent by the computation unit 8. As shown in FIG. 3A, the optimization unit 9 includes an information module INFO1 10 that is designed to generate a request for confirmation that the consumer system or systems will receive, in the future, the estimated total power requirement value calculated by the computation unit 7. The information module 10 is also designed to send the confirmation request to the consumer systems. The optimization unit 9 also includes a decision module DEC1 11. The decision module 11 is designed to compare the estimated available power value provided by the computation unit 8 and the estimated total power requirement value provided by the computation unit 7.

If the estimated available power value is obtained using a current available power value dependent on mechanical power draw capacity data determined by the determination unit 4, the decision module 11 is also able to:
generate a request to reduce the idle speed of the engine 2 if the estimated available power value is greater than the estimated total power requirement value,
generate a request to maintain the idle speed of the engine 2 if the estimated available power value is equal to the estimated total power requirement value, and
generate a request to increase the idle speed of the engine 2 to adapt to the power requirements of the consumer systems if the estimated available power value is less than the estimated total power requirement value.

If the estimated available power value is estimated using the current available power value as a function of pneumatic power draw capacity data calculated by the determination unit 4, the decision module 11 is able to:
generate a request to increase the idle speed of the engine 2 if the estimated available power value is less than the estimated total power requirement value,
generate a request to maintain the idle speed of the engine 2 if the estimated available power value is equal to the estimated total power requirement value, and
generate a request to reduce the idle speed of the engine 2 to adapt to the power requirements of the consumer systems if the estimated available power value is greater than the estimated total power requirement value.

The optimization result is the request to reduce idle speed, the request to maintain idle speed, or the request to increase idle speed.

In this first preferred embodiment, the system 1 includes a control unit or controller CONT1 17 that is designed to:
issue an order to reduce the idle speed of the engine or engines 2 of the aircraft AC, if the optimization result is associated with a request to reduce idle speed,
issue an order to increase the idle speed of the engine or engines of the aircraft AC, if the optimization result is associated with a request to increase idle speed, and
issue no order if the optimization result is related to a request to maintain idle speed.

In a second embodiment of the optimization unit 9, the optimization criterion is reaching a predetermined thrust value. The predetermined power value associated with this optimization criterion is a target thrust value.

Figure 3B:
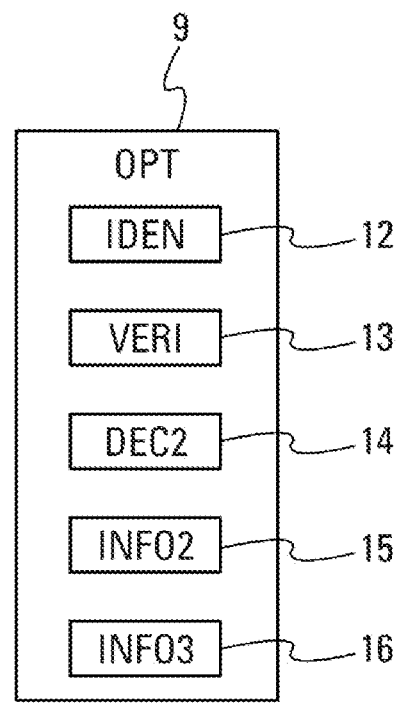

The target thrust value is provided by the processors of the aircraft AC in charge of calculating thrust. This thrust calculation can be performed manually using the throttle lever or automatically using the automatic throttle. As shown in FIG. 3B, in this second embodiment, the optimization unit 9 has a verification module VERI 13. This verification module 13 is designed to verify whether the estimated total power requirement value and the target thrust value are compatible.

Within the scope of this invention, "power compatibility" means that the engine 2 is producing enough power to enable the power draw required to satisfy the power requirements of the consumer systems.

The verification module 13 is also designed to generate and issue a request for confirmation from the consumer system or systems that the system or systems will receive, in the future, the estimated total power requirement value calculated by the computation unit 7 and a request to adapt the engine 2 to the target thrust value, if the target thrust value and the estimated total power requirement value are compatible. The verification module 13 is designed to generate and issue an incompatibility request in all other cases.

Furthermore, the optimization unit 9 includes an identification module IDEN 12 designed to identify a future reduced power requirement value. This reduced power requirement value is identified using limitation data on one or more remotely managed power requirements of consumer systems sent by the consumer system or systems.

The optimization unit 9 also includes a decision module DEC2 14 that is designed, in the event of an incompatibility request being sent by the verification module 13, to:
generate a request for the engine to reach the target thrust value, if the target thrust value and the reduced power requirement value identified by the identification module 12 are compatible, and generate a request to increase the idle speed of the engine to adapt to the reduced power requirement value, if the target thrust value and the reduced power requirement value identified by the identification module 12 are not compatible.

As shown in FIG. 3B, the optimization unit 9 has an information module INFO2 15 that is designed to generate and issue a request to limit the power consumption of the remotely managed power requirements of the consumer system or systems, if an incompatibility request between the target thrust value and the estimated total power requirement value has been sent by the verification module 13.

Furthermore, the optimization unit 9 also includes an information module INFO3 16 that is designed to generate and transmit, either to the pilot or to a flight management processor of the aircraft AC, a request to use the auxiliary power source or sources and a request to modify the optimization criterion if the target thrust value and the reduced power requirement value identified by the identification module 12 are not compatible.

In this second embodiment, the optimization result is either the request for the engine to reach the target thrust value, or the request to increase the idle speed of the engine to adapt to the reduced power requirement value.

In this second preferred embodiment, the control unit 17 is designed to issue:
an order to adapt the engine 2 to reach the target thrust, if a request to reach the target thrust value is generated by the decision module 14, and
an order to increase the idle speed of the engine 2 to reach the reduced power requirement value, if a request to increase the idle speed of the engine is generated by the decision module 14.

The control unit 17 is also designed to generate and transmit, to the consumer systems, an order to adapt the estimated total power requirement if a request to limit the power consumption for the remotely managed power requirements of the consumer system or systems is sent by the information module 15.

As shown in FIG. 2, the system 1 also includes a pneumatic draw management unit MAN1 18. This management unit 18 includes an acquisition module ACQ1 19 that is designed to acquire current pneumatic draw data. These current pneumatic draw data represent a current pneumatic draw flow rate from the engine or engines 2 of the aircraft AC and from the auxiliary power source or sources 3. By way of example, the current pneumatic draw flow rate is between 0 and 2 kg/s. The management unit 18 also includes an acquisition module ACQ2 20 that acquires information relating to operation of the pneumatic draw or stoppage of the pneumatic draw if a pneumatic draw stoppage request is received by a draw system.

Furthermore, the management unit 18 includes a computation module COMP3 21 designed to calculate a future estimated pneumatic draw value using the current pneumatic draw data provided by the acquisition module 19 and the pneumatic draw stoppage information provided by the acquisition module 20. This estimated pneumatic draw value is calculated and sent to the computation unit 8.

The management unit 18 also includes a control module CONT2 22. This control module 22 is designed to order the future stoppage of the pneumatic draw if the information required by the acquisition module 20 are associated with a request to stop pneumatic draw from the engine 2 and/or from the auxiliary power unit 3.

As shown in FIG. 2, the system 1 includes a power management unit MAN2 23 that includes an acquisition module ACQ3 24 designed to acquire a current charged power value and a current state of charge of a secondary power source. By way of example, the secondary power source is a battery carried on board the aircraft AC. The current charge power value is the power value that can be supplied by the battery. The power management unit 23 also includes a computation module COMP4 25 that calculates a current power difference value. This current power difference value represents the difference between the current available power value provided by the determination unit 4 and the current power consumption value provided by the determination unit 5. The power management unit 23 also includes a decision module DEC3 26 that is designed to:
issue an order to charge the battery, if the current power difference value is positive or zero. This situation occurs if there is more power being generated than power being consumed by the consumer systems,
send, to the battery, an order to provide a charged power value equal to the current power difference value, if the current power difference value is negative and if the charged power value of the battery is greater than the current power difference value. The charged power in the battery is used to make up the deficit between the power requirements of the consumer systems and the available power, and
send, to the battery, an order to provide all of the charged power and to send a temporary limitation order applicable to the current power consumption to the consumer systems, if the current power difference value is negative and if the charged power value of the secondary source is less than the current power difference value.

The system 1 as described above implements a power draw management method shown in FIGS. 4, 5A and 5B. The method comprises a succession of steps that are generated by the system 1 recurrently.

During a determination step E1 of the method, one or more of the current available power values are determined by the determination unit 4. The current available power value or values are obtained using data on power draw capacity from the engine or engines 2 and from the auxiliary power unit 3. These power draw capacity data can be associated with mechanical draw, pneumatic draw, or both.

One or more of the current power consumption values are also determined during a determination step E2 of the method by the determination unit 5. These data are determined on the basis of current power data provided by the consumer systems. This value or values represent the power consumption in real-time of the consumer systems of the aircraft AC.

During a determination step E3 of the method, a variation value in the power required by the consumer systems is determined. This variation value is the difference between a future estimated power consumption value for certain consumer systems and the current power consumption value. The future estimated power consumption value is provided by a predetermined power estimation model.

The computation unit 7 calculates, during a computation step E4 of the method, a future estimated total power requirement value for the consumer systems. This estimated total power requirement value is obtained using the current power consumption value determined by the determination unit 5 and the current available power value determined by the determination unit 4.

As shown in FIG. 4, after the determination step E2, a management step E5 of the pneumatic draw method is executed. The pneumatic draw management step E5 includes the succession of sub-steps E51, E52, E53 and E54.

During the acquisition sub-step E51, data relating to the pneumatic draw from the engine 2 of the aircraft AC and from the auxiliary power source 3 by a draw system are acquired using the acquisition module 19. These pneumatic draw data are associated with a pneumatic draw quantity, such as a quantity of air or a quantity of power drawn by the pneumatic network. The acquisition module 20 acquires, during the acquisition sub-step E52, information relating to operation or to a pneumatic draw stoppage request. This information is associated with receipt of a request to stop the pneumatic drawer by the draw system or the absence of any request. During the computation sub-step E53, the computation module 21 calculates a future estimated pneumatic draw value representing the portion of power that would be supplied by the pneumatic network in the future. The computation module 21 calculates this pneumatic draw value using current pneumatic draw data acquired by the acquisition module 19 and pneumatic draw stoppage information acquired by the acquisition module 20. Regardless of whether a pneumatic draw stoppage request has been received by the draw system, the computation module 21 calculates the estimated pneumatic draw value and sends the value to the computation unit 8.

The pneumatic draw is not stopped by the draw system immediately, but rather in the future during the control sub-step E54, giving the engine 2 enough time to adapt its idle speed.

The computation unit 8 calculates, during a computation step E6 of the method, a future estimated available power value. This future estimated available power value is obtained using the current available power value determined by the determination unit 4 and an estimate criterion. The estimate criterion is, for example, a criterion relating to a constant idle speed of the engine 2. This estimated available power value is also calculated using a future estimated pneumatic draw value and calculated by the computation module 21.

By comparing the future estimated total power requirement value calculated by the computation unit 4 with a power value associated with one or more optimization criteria, during an optimization step E7 of the method, the optimization unit 8 determines an optimization result.

In the first embodiment, the optimization criterion is an adaptation of the thrust of the engines 2 to the power draw by limiting the reduction in the requirements of the consumer systems, or an adaptation of the engine or engines 2 and of the auxiliary source 3 to a stoppage of the pneumatic power draw executed in the future. The power value associated with the optimization criteria in this first embodiment is the estimated available power value sent by the computation unit 8.

As shown in FIG. 5A, the optimization step E7 includes the following sub-steps E7A1 and E7A2.

During the information sub-step E7A1, the information module 10 generates and sends to the consumer systems a request for confirmation that the systems will receive, in the future, the power value required to cover the power requirements of the systems.

In parallel, if the estimated available power value is calculated using a current available power value dependent on mechanical power draw capacity data determined by the determination unit 4, the decision module 11 generates, during sub-step E7A2:

a request to reduce the idle speed of the engine 2 if the estimated available power value is greater than the estimated total power requirement value, a request to maintain the idle speed of the engine 2 if the estimated available power value is equal to the estimated total power requirement value, and a request to increase the idle speed of the engine 2 to adapt to the power requirements of the consumer systems if the estimated available power value is less than the estimated total power requirement value.

If the estimated available power value is obtained using a current available power value calculated by the determination unit 4 and dependent on mechanical power draw capacity data, the decision module 11 generates, during sub-step E7A2:

a request to increase the idle speed of the engine 2 if the estimated available power value is less than the estimated total power requirement value, a request to maintain the idle speed of the engine 2 if the estimated available power value is equal to the estimated total power requirement value, and a request to reduce the idle speed of the engine 2 to adapt to the power requirements of the consumer systems if the estimated available power value is greater than the estimated total power requirement value.

The optimization result representing the increase, maintain or reduce request generated by the decision module 11 is sent to the control unit 17.

During a control step E8 of the method, the control unit 17 sends to the engines 2:

an order to reduce the idle sped, if the optimization result is associated with a request to reduce idle speed, an order to increase the idle speed, if the optimization result is associated with a request to increase idle speed, no order if the optimization result is associated with a request to maintain idle speed.

The order to adapt the idle speed of the engine or engines 2 is sent to the engines 2 that use the time between the future time and the current time to adapt their idle speed.

In the second embodiment, the optimization criterion is the reaching of a predetermined thrust value associated with a target thrust value. As shown in FIG. 5B, the optimization step E7 includes the succession of sub-steps E7B1, E7B2, E7B3, E7B4 and E7B5.

During the identification sub-step E7B1, the identification module 12 identifies a reduced power requirement value, using data on the limitation of the remotely managed requirements of consumer systems. This reduced power requirement value is the power value that will be required by the consumer systems to operate in the future, once the consumption of some of these requirements has been reduced. The limitation data are provided by the consumer system or systems including the remotely managed requirements.

During sub-step E7B2, the verification module 13 checks whether the estimated total power requirement value and the target thrust value are compatible.

If the two values are compatible, the verification module 13 generates a request for confirmation that the consumer systems will receive, in the future, the estimated total power requirement value calculated by the computation unit 7 and a request to adapt the engine 2 to the thrust power value. The verification module 13 sends the confirmation request to the consumer systems and the idle-speed adaptation request to the control unit 17.

If the estimated total power requirement value and the target thrust value are not compatible, the verification module 13 generates and issues an incompatibility request.

During decision sub-step E7B3, the decision module 14 generates, in the event of an incompatibility request being sent by the verification module 13:

a request for the engine to reach the target thrust value, if the target thrust value and the reduced power requirement value identified by the identification module 12 are compatible, and a request to increase the idle speed of the engine to adapt to the reduced power requirement value, if the target thrust value and the reduced power requirement value identified by the identification module 12 are not compatible.

If a request to reach the target thrust value is generated by the decision module 14, the control unit 17 generates an order to adapt the engine 2 to reach the target thrust.

If a request to increase the idle speed of the engine is generated by the decision module 14, the control unit 17 generates an order to increase the idle speed of the engine 2 to reach the reduced power requirement value.

Furthermore, if the information module 15 receives the incompatibility request sent by the verification module 13, the information module, during the information sub-step E7B4, generates a request to limit the power consumption for the remotely managed requirements of the consumer system or systems, and sends this limitation request to the control unit 17. The control unit 17 then generates and sends an order to adapt the estimated total power requirement to the consumer systems.

The time between the current time and the future time is used by the consumer systems to limit their remotely managed requirements if a limitation request is sent. The time between the current time and the future time is also used by the engine 2 to adapt its idle speed.

As shown in FIG. 5B, if the target thrust value and the reduced power requirement value, as identified by the identification module 12, are not compatible, the information module 16 determines and sends to the aircraft AC a request to use the auxiliary power source or sources 3 and a request to modify the optimization criterion. The use of an auxiliary power source 3 can help the engine to generate the power required for the limited requirements of the consumer systems and to reach the target thrust.

Furthermore, following determination step E2, a power management step E9 of the method is implemented by a power management unit 23. This power management step E9 is executed repeatedly. The time between two repetitions is, for example, between 10 ms and 200 ms.

The power management step E9 includes the following succession of sub-steps E91, E92 and E93. During the acquisition sub-step E91, the current charged power value of a secondary power source and the state of charge thereof are acquired by the acquisition module 24. This secondary power source can, for example, be a battery on board the aircraft or on the ground. A current power difference value is calculated during the computation sub-step E92. This difference value is the difference between the current available power value determined during the determination step E1 by the determination unit 4 and the consumed power value determined during the determination step E2 by the determination unit 5. During the decision sub-step E93, the decision module 26:

issues an order to charge the battery, if the current power difference value is positive or zero, sends, to the battery, an order to provide a charged power value equal to the current power difference value, if the current power difference value is negative and if the charged power value is greater than the current power difference value. The power of the battery is used to make up the deficit between the power available from the engine or engines 2 and the auxiliary power source 3 and the power consumed by the consumer systems, and sends, to the battery, an order to supply all of the charged power value in the battery to make up the deficit between the power available and the power consumed, and also sends, to the consumer systems, an order to temporarily limit the requirements of the consumer systems.

The system 1, as described above, has the following advantages:

enabling integration of engines 2 with a very high bypass ratio without limiting the structural optimization thereof, and enabling optimization of power consumption, in real time, where several power sources are used simultaneously.

Furthermore, the system 1 improves operations in the event of certain outages on the aircraft AC. Indeed, certain outages of the aircraft AC require certain functions of the consumer systems to be made unavailable. This is, for example, the case for passenger entertainment systems, for which the power required for operation can be limited temporarily, having an impact on the comfort and/or experience of the passengers. The system 1 helps to significantly minimize this temporary limitation, making the limitation imperceptible to passengers.

Furthermore, the system 1 also helps to reduce the idle thrust, that is, the minimum thrust required to ensure both stability of the engine 2 and the power draw. Reducing the idle thrust provides the following advantages:

consumption reduced by approximately 0.5% of total consumption for a standard mission (800 NM), improved ground control of the aircraft AC, reduced wear caused to brakes, improved sink rate, which enables compatibility with certain operational constraints imposed by the airport, air-traffic control rules, etc., reduced duration of the deceleration stage, which reduces the total flight time, and reduced use of air brakes to slow the aircraft AC during the descent phase, with a consequent reduction in the workload of the pilot, noise and potentially maintenance costs.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for controlling idle speed and power draw, said power being generated by at least one engine of an aircraft, comprising the following successive steps:
   a first determination step implemented by a first determination unit, that involves determining at least one current available power value using data on current power draw capacity from said at least one engine of the aircraft and from at least one auxiliary power source,
   a second determination step, implemented by a second determination unit, that involves determining at least one current power consumption value using current power data representing power requirements of at least one consumer system of the aircraft,
   a third determination step, implemented by a third determination unit, that involves determining at least one future power requirement variation value, using power data estimated by said at least one consumer system and said current power data, said estimated power data representing future power requirements of said at least one consumer system,
   a first computation step, implemented by a first computation unit, that involves calculating at least one future estimated total power requirement value using said at least one current power consumption value and said at least one future power requirement variation value,
   a second computation step, implemented by a second computation unit, that involves calculating at least one future estimated available power value based on said at least one current available power value, at least one future estimated pneumatic draw value and as a function of at least one estimate criterion,
   an optimization step, implemented by an optimization unit, that involves determining an optimization result by comparing said at least one future estimated total power requirement value with at least one power value associated with at least one optimization criterion, and
   a control step, implemented by a controller, that involves issuing an adaptation order of an idle speed of said at least one engine, an adaptation order for the future estimated total power requirement value or no order as a function of the optimization result.

2. The method according to claim 1, further comprising a power management step, implemented by a power management unit following the second determination step, said power management step including the following successive sub-steps:
   a first acquisition sub-step, implemented by a first acquisition module, that involves acquiring at least one current charged power value and a current state of charge of a secondary power source,
   a first computation sub-step, implemented by a first computation module, that involves calculating at least one current power difference value between said at least one current available power value and said at least one current power consumption value,
   a decision sub-step, implemented by a decision module, that involves:
      issuing an order to charge the secondary source, if said at least one current power difference value is positive or zero,
      sending, to the secondary source, an order to provide at least one charged power value equal to said at least one current power difference value, if said at least one current power difference value is negative and if said at least one charged power value of the secondary source is greater than said at least one current power difference value, and
      sending, to said secondary source, an order to provide all of the charged power and sending a temporary limitation order applicable to current power consumption to said at least one consumer system, if said at least one current power difference value is negative and if said at least one charged power value of the secondary source is less than said at least one current power difference value.

3. The method according to claim 1, wherein the optimization step also includes an identification sub-step, implemented by an identification module, that involves identifying at least one future reduced power requirement value using limitation data on at least one power requirement of said at least one consumer system.

4. The method according to claim 1, further comprising a pneumatic draw management step, implemented by a pneumatic draw management unit before the second computation step, said pneumatic draw management step including the following successive sub-steps:
   a second acquisition sub-step implemented by a second acquisition module, that involves acquiring data on current pneumatic draw associated with a current pneumatic draw quantity from said at least one engine of the aircraft and from said at least one auxiliary power source,
   a third acquisition sub-step, implemented by a third acquisition module, that involves acquiring pneumatic draw control information if a pneumatic draw stoppage request is received by at least one draw system,
   a second computation sub-step, implemented by a second computation module, that involves calculating said at least one future estimated pneumatic draw value using current pneumatic draw data and pneumatic draw control information, and
   a control sub-step, that is implemented by a control module, that involves ordering a future stoppage of the pneumatic draw by said at least one draw system as a function of the pneumatic draw control information.

5. The method according to claim 1, wherein said power requirements of at least one consumer system include at least:
   remotely managed power requirements,
   power requirements essential to operation of at least one consumer system that are not predictable in time,
   power requirements essential to operation of at least one consumer system that are predictable in time, and
   power requirements that are not essential to operation of at least one consumer system and that are not predictable in time.

6. A system for controlling idle speed and power draw, said power being generated by at least one engine of an aircraft, comprising:
   a first determination unit configured to determine at least one current available power value using data on current power draw capacity from said at least one engine of the aircraft and from at least one auxiliary power source,
   a second determination unit configured to determine at least one current power consumption value using current power data representing the power requirements of at least one consumer system of the aircraft,
   a third determination unit configured to determine at least one future power requirement variation value, using power data estimated by said at least one consumer system and said current power data, said estimated power data representing future power requirements of said at least one consumer system, a first computation unit configured to calculate at least one future estimated total power requirement value using said at least one current power consumption value and said at least one future power requirement variation value, a second computation unit configured to calculate at least one future estimated available power value based on said at least one current available power value, at least one future estimated pneumatic draw value and as a function of at least one estimate criterion, an optimization unit configured to determine an optimization result by comparing said at least one future estimated total power requirement value with at least one power value associated with at least one optimization criterion, and a controller, that is configured to issue an adaptation order of an idle speed of said at least one engine, an adaptation order for the future estimated total power requirement value or no order as a function of the optimization result.

7. The system according to claim 6, further including a power management unit comprising:

a first acquisition module that is configured to acquire at least one current charged power value and a current state of charge of a secondary power source, a first computation module configured to calculate at least one current power difference value between said at least one current available power value and said at least one current power consumption value, a decision module configured to:
issue an order to charge the secondary source, if said at least one current power difference value is positive or zero, send, to the secondary source, an order to provide at least one charged power value equal to said at least one current power difference value, if said at least one current power difference value is negative and if said at least one charged power value of the secondary source is greater than said at least one current power difference value, and send, to said secondary source, an order to provide all of the charged power and to send a temporary limitation order applicable to a current power consumption to said at least one consumer system, if said at least one current power difference value is negative and if said at least one charged power value of the secondary source is less than said at least one current power difference value.

8. The system according to claim 6, wherein the optimization unit also includes an identification module designed to identify at least one future reduced power requirement value using limitation data relating to at least one power requirement of said at least one consumer system.

9. The system according to claim 6, further comprising a pneumatic draw management unit comprising:

a second acquisition module configured to acquire data on current pneumatic draw associated with a current pneumatic draw quantity from said at least one engine of the aircraft and from said at least one auxiliary source, a third acquisition module configured to acquire pneumatic draw control information if a pneumatic draw stoppage request is received by at least one draw system, a second computation module configured to calculate at least one future estimated pneumatic draw value using current pneumatic draw data and pneumatic draw control information, and a control module configured to order a future stoppage of the pneumatic draw by said at least one draw system as a function of the pneumatic draw control information.

10. An aircraft, comprising the system for controlling idle speed and power draw as defined in claim 6.

* * * * *